May 18, 1965     C. E. ANDERSON     3,184,213

SEAT FOR TOP ENTRY BALL VALVE

Filed Oct. 8, 1962

Clifford E. Anderson
INVENTOR.

BY Russell E. Schloff
ATTORNEY

United States Patent Office 3,184,213
Patented May 18, 1965

3,184,213
SEAT FOR TOP ENTRY BALL VALVE
Clifford E. Anderson, Houston, Tex., assignor to ACF Industries, Incorporated, New York, N.Y., a corporation of New Jersey
Filed Oct. 8, 1962, Ser. No. 229,016
9 Claims. (Cl. 251—172)

This invention relates to spherical plug valves, commonly referred to in the industry as ball valves, and more particularly to a top entry ball valve having a non-floating valve member and a sealing element with a resilient seat member which seals by pressure actuation both upstream and downstream over the full pressure range of the valve.

Ball valves themselves are quite old and are rather simple in construction being comprised of a valve body having a central valve chamber, a spherical valve member positioned in the valve chamber, and one or two seat members. The valve member has a passage therethrough which in the open position of the valve registers with the inlet and outlet ports in the body, and a stem which projects through the body and provides means to rotate the ball 90° between open and closed positions. Seats for ball valves have been generally formed of various plastic materials. Originally, rubber was used, but with the development of the fluorocarbons, such material has more or less replaced rubber. Various of the ball valves have been of the top entry type, that is, having an open top valve chamber through which the ball and seats are inserted.

Most of the seals established in ball valves have been of the compression type, that is, the seats are compressed between the valve member and a portion of the body to build up an internal force in the seat which causes the seat to maintain intimate contact with the spherical surface of the valve member and the body whereby a seal is established. The compression provides not only the initial seal, but also the seat used for normal function of the valve.

The ball valve of the present invention has been designed to overcome various shortcomings of the prior art ball valves. It is of the top entry type having a unitary body provided with an open top chamber interposed between opposed inlet and outlet ports. A spherical plug valve member having two stems is positioned in the valve chamber. One stem is trunnioned in the bottom wall of the valve chamber and the other, which is the operating stem, is trunnioned in an aperture in a bonnet which closes the valve chamber. With such construction the valve member is non-floating, in other words restrained from moving downstream; therefore, the high bearing load on the sealing surface of the downstream seat which results if the valve member is free to float is eliminated. Interposed between the valve member and the end walls of the chamber are sealing elements. Each sealing element is so designed that it is pressure acting both upstream and downstream and the valve will operate with a single sealing element. Each sealing element is comprised of a seat member formed of resilient material, an annular retainer ring which affords circumferential support for the seat member and a restraining washer which affords internal support. Each seat member has a face mass which forms a seal with the spherical surface of the valve member and a rear mass radially and axially spaced from the face mass which seals against the end wall of the chamber. The seat members are so constructed that they will be pressure acting both upstream and downstream over the entire pressure range of the valve. The front mass of the seat member acts as a dynamic seal and moves to form a seal with the spherical surface of the valve member, either upstream or downstream. The rear mass acts as a pressure acting static seal in contact with the end wall of the valve chamber. It has been found that by using a pressure acting seal for the rear mass that the sealing elements may be inserted into the valve body with facility and that tolerances for the seat member may be loosened.

It is the principal object of the present invention to provide a top entry ball valve having a normally non-floating valve member and a sealing element with a fully pressure acting resilient seat member which provides a pressure actuated seal either upstream or downstream over the entire pressure range of the valve and which is so designed that on the upsteam side it will not protrude into the path of the rotating valve member.

It is an object to provide a top entry ball valve having a trunnioned ball and a fully pressure acting resilient seat member in which the seat member is provided with means which deflects high flow from the back of the upstream seat.

It is another object to provide a top entry ball valve having a normally non-floating valve member and a fully pressure acting sealing element with a resilient seat member in which the mass of the seat member sealing with the spherical surface of the valve member can move relative to such surface without disengaging the pressure actuated rear seal that is engaged with the end wall of the chamber from contact with such wall, and will not further protrude into the path of the valve member.

It is still another object to provide a top entry trunnioned ball valve having a sealing element utilizing a resilient seat member having a pressure acting face seal and a pressure acting rear seal.

It is a further object to provide a top entry ball valve with a non-floating valve member and a resilient seat member which forms pressure acting face and rear seals encased in an annular retainer ring which provides full circumferential support for the seat member and a restraining washer which deflects flow on the upstream side.

It is still a further object to provide a top entry ball valve having a normally non-floating valve member and a sealing element with a fully pressure acting resilient seat member which is so designed that the seat member will not extrude during the time that a portion thereof is unsupported while the valve is being operated.

Other and further objects of the invention will be obvious upon an understanding of the illustrative embodiments about to be described, or will be indicated in the appended claims, and various advantages not referred to herein will occur to one skilled in the art upon employment of the invention in practice.

Preferred embodiments of the invention have been chosen for purpose of illustration and description and are shown in the accompanying drawings, forming a part of the specification, wherein.

Figure 1:
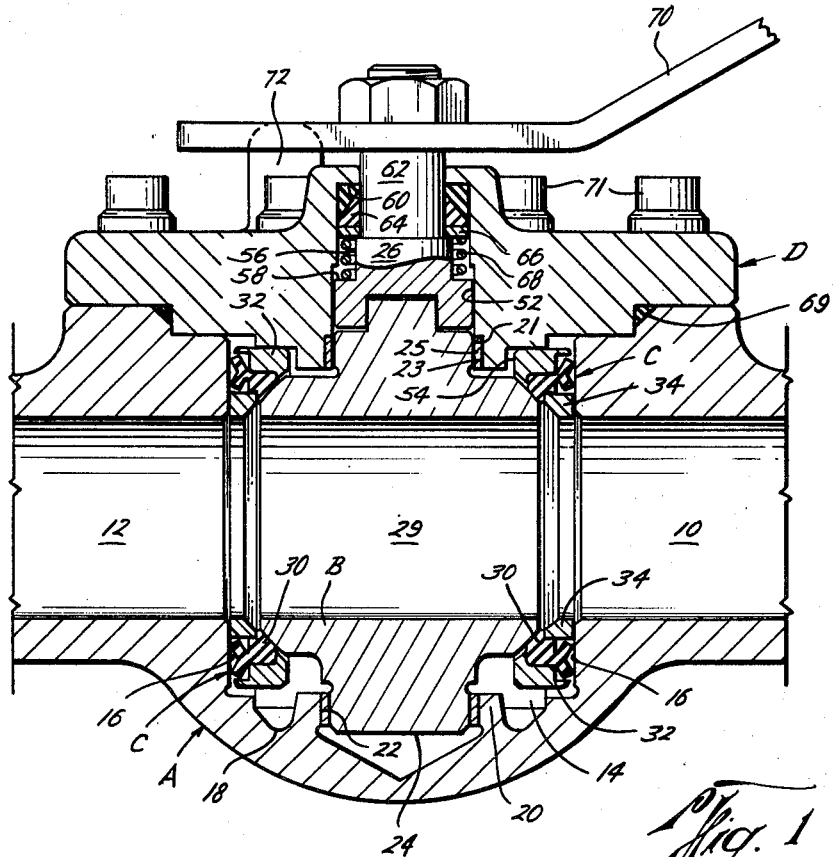
FIG. 1 is a central vertical section through a valve of the present invention, the valve being shown in the open position.

Referring now to FIG. 1, the valve is comprised generally of a valve body A, a spherical valve member B, two sealing element C—C and a bonnet D.

The valve body A has two axially aligned fluid passages 10 and 12 forming inlet and outlet ports respectively. Interposed btewean the two passages 10 and 12 is an open top valve chamber 14. The chamber 14 has parallel flat inner walls 16—16 surrounding the passages 10 and 12 and a generally hemispherically shaped bottom wall 18 having a centrally located boss member 20. The boss member has an aperture 22 therein.

The spherical valve member B is positioned in the valve chamber 14. The valve member B has two stems 24 and 26. The stem 24 is trunnioned in the aperture 22 of the boss member 20. An antifriction bushing 28 is interposed between the stem 24 and the aperture 22. The other stem 26 extends out past the top of the open-ended valve chamber 14 and is trunnioned in the bonnet D and functions as the operating stem. The stem 26 may be integral or as shown in the drawings the stem 26 may be a separate piece attached to the valve member B by a tongue and groove connection which prevents floating in closed position. With such construction, the top of the valve member B may be formed with a turned portion 21 which is trunnioned in an aperture 23 in the bonnet D. As with the lower stem 24 an antifriction sleeve bushing 25 may be interposed between the wall of aperture 23 and turned portion 21 of the stem 26. By trunnioning the valve member B, force applied by upstream line pressure, when the valve is closed, will cause the valve member B to move downstream thereby eliminating the high bearing loads on the downstream sealing element resulting from a floating valve member. Also, having a non-floating valve member B permits sealing elements C—C to function as pressure actuated seals both upstream and downstream. As the size of the valve decreases, it may be more preferable to cantilever the valve member B rather than trunnion it both top and bottom. On the other hand, for high pressure ranges it may be desirable to extend stem 24 completely through the body A to eliminate the pressure thrust of the valve member B. The spherical valve member B has a passage 29 therethrough which in the open position is aligned with the passages 10 and 12 to form the run of the valve. As is customary in ball valves, the spherical valve member B is rotatable 90° between open and closed positions.

The sealing elements C—C are positioned between the valve member B and the flat end walls 16—16 of the valve chamber 14. Each sealing element C is formed of a seat member 30, an annular retainer ring 32 and a flat annular restraining washer 34 having an axially extending lip 35 surrounding its inner circumference.

The seat member 30 is formed of resilient material. By resilient material it is meant a material having the following qualifications: impervious to inner leakage; flexible enough to conform to the spherical surface of the valve member; sufficiently flexible to move with the pressure for which it is designed so that an upstream and downstream pressure actuated seal can be effected; resistant to fluids likely to be carried by the valve; sufficient internal strength to resist excessive distortion and to resist being blown out during operation; low coefficient of friction to permit easy operation; stable characteristics over wide temperature range; fair degree of resiliency; easy to handle and simple to use; economically available. While these requirements may at first appear rigorous, it has been found that one of the fluorocarbon plastics, i.e., polytetrafluoroethylene sold by DuPont under the trademark "Teflon," satisfactorily fulfills the above rerequirements and provides a usable material for the seat member 30. Depending upon the size, lading to be carried and pressure rating, the seat member 30 may be formed of other materials including other fluorocarbon plastics, nylon, other plastics; hard rubber, etc.

Figure 2:
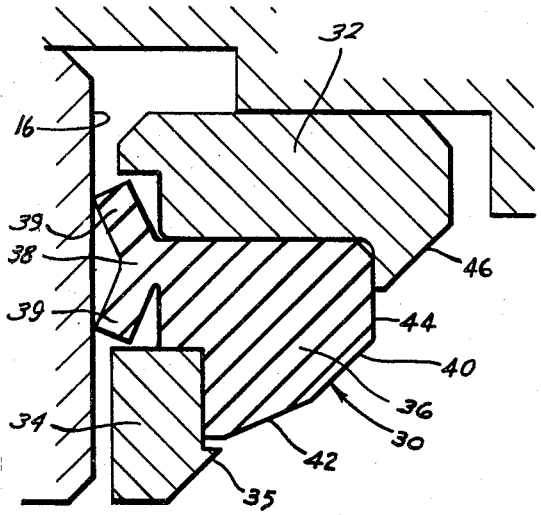
FIG. 2 is an enlarged diagrammatic sectional view of the sealing element.

Each seat member 30 has a face mass 36 which forms a seal with the spherical surface of the valve member B and a rear mass 38 radially and axially spaced from the face mass 36, which forms a seal against the inner wall 16 of the chamber 14. The face mass 36 and rear mass 38 are connected by a relatively thin web adjacent the outer circumference of the face mass. The rear mass is bifurcated having two leg portions 39—39. The radially outer one extends radially beyond the face mass and is subject to pressure in the valve and the radially inner one is subject to line pressure. The unassembled axial length of the sealing assemblies C—C and valve member D is slightly greater than the axial length between the walls 16—16; therefore, on assembly there is an interference induced which slightly deforms the seat member 30—30. If only one sealing element is used, the same deformation will result since the valve member B is centrally located and the unassembled axial length from the center line of the valve member B to the end of the sealing element C is greater than the axial length from the center line of the valve to the end wall 16 of the chamber. The interference resulting from assembly will depend upon manufacturing tolerances which must be sufficiently loose to permit economical manufacture yet within bounds so that within such tolerances the valve can be assembled with facility and still produce workable sealing elements over the entire pressure range of the valve. Since the face and rear seals are pressure actuated, the tolerances of the seat member can be fairly loose as the seat does not depend on deformation for operation. The face mass 36 is deformed between the spherical surface of the valve member B and the restraining ring 34, which is arrested by the end wall 16, see FIG. 2. This is in the nature of a coining or setting operation, however, the function of the face mass 36 does not depend upon such deformation. The rear mass 38 is also slightly deformed by the end wall 16, however, the rear seal does not depend on such deformation for sealing, but rather on the pressure acting on the legs 39 making, in effect, a lip seal.

The face mass 36 initially has a frusto conical surface 40 which is the area contacting the spherical surface of the valve member B at the loci of points generally tangent to a radius extending 45° from the horizontal axial center-line of the valve member B. By having the frusto conical surface 40 tangent to the 45° radius, the surface will be equal on each side regardless of whether the valve is open or closed and also permits minor misalignment without destroying the seal. As previously mentioned, upon assembly this frusto conical surface 40 will tend to change to a spherical-like surface, see FIG. 2. Axially outward of the frusto conical surface 40 the face mass has a surface 42 which tapers away from the frusto conical surface 40. The surface 42 is relieved so as to form an entry surface for the edge of the passage in the valve member B when it moves to the closed position. Axially inward of the frusto conical surface 40 there is a surface 44 which is normal to the run of the valve and provides an entry surface for the passage in the valve member B in moving from closed to open position. In the fully closed and fully open positions, the surface 40 of the face mass 36 is in direct contact with the spherical surface of the valve member and supported thereby; however, during operation, a portion of the face mass 36 is out of contact with the spherical surface of the valve member B as the passage 29 moves around. Therefore, the face mass 36 must be of sufficient strength so that the portion of the face mass 36 which is unsupported during operation of the valve will not be blown downstream or move out of position whereby it could be cut by the trailing edge of the passage 29. Since the unsupported area is supported solely by its own strength, it must be of sufficient mass to provide the necessary rigidity. In order to provide sufficient strength, it has been found that it is desirable to make the axial length of the face mass slightly greater than the radial distance. In order to further reinforce the face mass, other means are provided which will be described subsequently.

The rear seal 38 is also pressure acting. The legs 39—39 form lip seals which are forced against the end wall 16 by pressure. For example, on the upstream side, the line pressure acts against the radially inner leg 39 forcing it into intimate contact with the end wall 16. Even though the seat member may tend to move away from the end wall 16, line pressure will still maintain the leg 39 securely against the end wall 16 in sealing contact. Since the rear seal is pressure acting, and does not depend upon internal deformation for its sealing capabilities, the tolerance may be sufficiently large to assure economical machining without effecting the operation of the valve.

Also, since the seal does not depend upon built-in deformation for sealing, it is fairly easy to assemble since no built-in deformation is required.

The annular retainer ring 32 gives full circumferential support to the seat member 30 and thereby limits radial expansion of the seat member. It also provides a pocket for the seat member 30 facilitating top entry. The annular retainer ring 32 in particular provides circumferential support for the seat member 30. The retainer ring 32 has a lip portion 46 which is spaced from and projects in front of the surface 44 of the face mass to limit the movement of the surface 44 when the seat member 30 is subjected to pressure forces which tend to move the face mass 36 axially inward along the surface of the spherical valve member B. The lip portion 46 is spaced from the surface 44 in order to allow a portion of the face mass 36 to flow along the surface of the ball working between the ball and retainer ring to effect the upstream seal. The lip 46 also supports the seat member 30 during the operation of the valve, particularly at higher pressures. It does so by affording support to the portion of the face mass 36 which as previously mentioned is unsupported during operation of the valve.

The restraining washer 34 is a flat annular ring which is positioned between the axial outer face of the face mass 36 and the end wall 16. As shown in FIG. 4, the inner circumference of the restraining washer 34 is provided with an axially extending lip 35 slightly radially outward of the tapering surface 42 of the face mass 36. The lip 35 of restraining washer 34 also affords support to the face mass 36 and prevents excess movement of the tapering surface 42 when the seal element C is acting as a downstream seal. On the upstream side, the lip 35 acts as a deflecting surface for the upstream flow and directs such flow against the tapering surface 42 of the face mass 36 rather than allowing it to be directed between the axial outer side of the face mass and the restraining washer which could cause the unsupported portion of the face mass during operation of the valve to be pushed out into the path of passage of the rotating valve member B. Such condition would be most prevalent during slow operation under high flow conditions. At such time, the large volume swiftly flowing between the seat 30 and the spherical wall of the valve member B could cause, if it were not deflected by the lip 35, the unsupported portion—that portion in line with passage 29—of the face portion 36 of the seat to be pushed out into the path of the lip of the passageway 29 which if it so extended will tend to cut it since the undeflected flow would tend to flow either behind the restraining ring 34 or between the restraining ring and seat. The lip deflects it sufficiently so that it is now directed against the tapering surface 42 which tends to keep the seat back against the restraining ring 34.

As previously mentioned, having a supported ball valve member B permits both seat elements C—C to be pressure actuated. In effect, as an upstream sealing element, the seat member 30 tends to expand along the spherical surface of the valve member B, the seat member 30 being forced into intimate contact and establishing a seal. On the downstream side, the body pressure flows around the outer periphery of the seat member 30 and tends to collapse it against the spherical surface of the valve member B again forcing the seat member 30 into intimate contact with the spherical surface of the valve member B and thereby establishing a seal. When acting as an upstream seal, the amount of movement is limited by the lip 46 of the retainer ring 32; and when acting as a downstream seal the amount of movement is limited by the lip 35 of the annular restraining washer 34 and the clearance between the valve member B and the restraining washer 34. Likewise, regardless of whether the seat member is acting as an upstream or downstream seal the bifurcated portion of the rear mass will act as a lip seal to seal against the end wall. In the case of acting as an upstream seal the radially inward leg will be sealed, and when acting as a downstream seal the radially outer leg will be sealed.

The bonnet D is provided with a bore 52 through which the operating stem 26 extends. To effect a seal between the stem 26 and bore 52, the stem 26 is provided with a narrower portion 56 and a shoulder 58. The bore 52 is also provided with a shoulder 60 and narrower portion 62. Packing consisting of two generally triangular shaped Teflon rings 64—64 and a metal ring 66 and spring 68 is located in the space formed by narrow portion 56 of the stem and the bore 52 between the shoulders 58–60. Other types of neck seals well known in the valve art may be used. To provide a seal between the bonnet D and chamber 14, there is a gasket 69. Fasteners 71 attach the bonnet D to the body A.

To provide means to operate the valve, a handle 70 is attached to the end of the stem 26. As is well known in the art, stops 72 are provided on the bonnet D to limit rotation of the valve member B between open and closed positions.

As various changes may be made in the form, construction and arrangements of parts herein without departing from the spirit and scope of the invention and without sacrificing any of its advantages, it is to be understood that all matter herein is to be interpreted as illustrative and not in a limiting sense.

What is claimed is:

1. A spherical plug valve comprising a valve body having two axially aligned fluid passages forming inlet and outlet ports and an open-top valve chamber interposed between said passages, the walls defining said chamber including end walls surrounding said passages, a rotatable generally spherical valve member positioned in the valve chamber, said valve member having a passage which in the open position of the valve registers with the inlet and outlet ports to form the run of the valve, an operating stem extending through the opening of the chamber, an annular seat member formed of resilient material positioned between the valve member and an end wall of the valve chamber, said seat member having a face mass provided with a valve engaging surface contacting the spherical surface of the valve member, a surface axially outward of said valve engaging surface being relieved so as to be out of contact with the spherical surface of the valve member and thereby form an entry surface for the edge of the passage in the valve member when it moves to the closed position and a surface normal to the run of the valve and a rear mass radially and axially removed from the face mass contacting the end wall, the rear mass being bifurcated and having two pressure actuatable leg portions, an annular metal retainer ring surrounding said seat member to afford it circumferential support, said retainer ring having a lip portion which is spaced from and projects in front of the face mass to limit the movement of the face mass when said mass is subjected to pressure forces tending to move the face mass axially inward along the surface of the spherical valve member, a flat retaining washer having a lip surrounding its inner circumference positioned between the seat member and the end wall, said lip on the upstream side deflecting the flow of lading from back of the seat to the face mass, a bonnet having a bore closing the opening of the valve chamber, the operating stem trunnioned in said bore, means attaching the bonnet to the body, means establishing a seal between the body and bonnet, and means to form a seal for said vertical bore.

2. A spherical plug valve comprising a valve body having two axially aligned fluid passages forming inlet and outlet ports and an open-top valve chamber interposed between said passages, the walls defining said chamber including end walls surrounding said passages and a bottom wall, a rotatable generally spherical valve member positioned in the valve chamber, said valve member having a passage which in the open position of the valve registers with the inlet and outlet ports to form the run of the valve and having two stems, one stem supported by the bottom wall and an operating stem extending through the opening of the chamber, an annular seat member formed of resilient material positioned between the valve member and an end wall of the valve chamber, the unassembled condition of said seat being of a slightly greater axial length than the axial length between the valve member and end wall of the valve chamber whereby the seat is slightly deformed by assembly, each seat member having a face mass provided with a valve engaging surface contacting the spherical surface of the valve member, a surface axially outward of said valve engaging surface being relieved so as to be out of contact with the spherical surface of the valve member and thereby form an entry surface for the edge of the passage in the valve member when it moves to the closed position and a surface normal to the run of the valve and a rear mass radially and axially removed from the face mass contacting the end wall, the rear mass being bifurcated and having two pressure actuatable leg portions, an annular metal retainer ring surrounding said seat member to afford it circumferential support, said retainer ring having a lip portion which is spaced from and projects in front of the face mass to limit the movement of the face mass when said mass is subjected to pressure forces tending to move the face mass axially inward along the surface of the spherical valve member, the leg portions of the rear mass forming pressure actuated lip seals with the end wall whereby the rear mass does not lose contact with the wall, a flat annular restraining washer between the face mass and end wall having a lip portion opposing the face mass around its inner circumference, a bonnet having a bore closing the opening of the valve chamber, the operating stem trunnioned in said bore, means attaching the bonnet to the body, means establishing a seal between the body and bonnet, and means to form a seal for said vertical bore.

3. A spherical plug valve comprising a valve body having two axially aligned fluid passages forming inlet and outlet ports and an open-top valve chamber interposed between said passages, the walls defining said chamber including end walls surrounding said passages and a bottom wall having a centrally located boss member, the boss having an aperture therein, a rotatable generally spherical valve member positioned in the valve chamber, said valve member having a passage which in the open position of the valve registers with the inlet and outlet ports to form the run of the valve and having a lower stem trunnioned in the aperture of the boss member, the top of the valve having a turned portion and an assembly interposed between the aperture and stem having a fusible portion, and an operating stem extending through the opening of the chamber, annular seat members formed of resilient material positioned between the valve member and flat end walls of the valve chamber, each seat member having a face mass provided with a valve engaging surface contacting the spherical surface of the valve member, and a rear mass radially and axially removed from the face mass contacting the end wall, the rear mass being bifurcated and having two pressure actuatable leg portions, an annular metal retainer ring surrounding each seat member to afford it circumferential support, said retainer ring having a lip portion which is spaced from and projects in front of the face mass to limit the movement of the face mass when said mass is subjected to pressure forces tending to move the face mass axially inward along the surface of the spherical valve member, a flat annular metal restraining washer between the face mass and end wall having a lip around its inner circumference opposing the face mass, a bonnet having a bore closing the opening of the valve chamber, the turned portion of the valve member trunnioned in said bore, the bonnet having a second bore through which the stem extends, means attaching the bonnet to the body, means establishing a seal between the body and bonnet and between the stem and its bore.

4. A spherical plug valve comprising a valve body having two axially aligned fluid passages forming inlet and outlet ports and an open-top valve chamber interposed between said passages, the walls defining said chamber including parallel flat end walls surrounding said passages, a rotatable generally spherical valve member positioned in the valve chamber, said valve member having a passage which in the open position of the valve registers with the inlet and outlet ports to form the run of the valve and having two stems, one stem adapted to be supported by the bottom wall and an operating stem extending through the opening of the chamber, annular seat members formed of elastomer material positioned between the valve member and flat end walls of the valve chamber, each seat member having a face mass provided with a valve engaging surface contacting the spherical surface of the valve member, and a rear mass radially and axially removed from the face mass contacting the end wall, the rear mass being bifurcated and having two pressure actuatable leg portions, an annular metal retainer ring surrounding each seat member to afford it circumferential support, a flat retaining washer having a lip surrounding its inner circumference opposing the face mass positioned between the seat member and end wall, a bonnet having a bore closing the opening of the valve chamber, the operating stem trunnioned in said bore.

5. A valve comprising a valve body having a valve chamber and inlet and outlet passages in communication with the valve chamber, a valve member disposed within the valve chamber and movable between open and closed positions relative to the inlet and outlet passages, means for imparting movement to the valve member, seat members formed of elastomer material positioned about the passages, each seat member having a face mass formed with a valve engaging surface sealingly engaging the valve member and having at least one entry surface thereon disposed in angular relation with the valve engaging surface, a rear mass, a relatively thin web connecting the face mass and rear mass, the rear mass being bifurcated and having two pressure actuatable leg portions in sealing engagement with the valve body, an annular metal retainer ring surrounding each seat member to afford it circumferential support, a flat restraining washer positioned between the face mass and the valve body, said washer having a lip surrounding its inner circumference and opposing the face mass, whereby said lip is adapted to direct fluid to impinge upon one of said entry surfaces.

6. A valve comprising a valve body having a valve chamber and inlet and outlet passages in communication with the valve chamber, a valve member disposed within the valve chamber and movable between open and closed positions relative to the inlet and outlet passages, means for imparting movement to the valve member, seat members formed of elastomer material positioned about the passages, each seat member having a face mass formed with a valve engaging surface sealingly engaging the valve member and at least one entry surface disposed in angular relation with the valve engaging surface, a rear mass, a relatively thin web connecting the face mass and rear mass at a position adjacent the outer circumference of the face mass, the rear mass being bifurcated and having two pressure actuatable leg portions in sealing engagement with the valve body, an annular metal retainer ring surrounding each seat member to afford it circumferential support, a flat restraining washer positioned between the face mass and the valve body, said washer having a lip surrounding its inner circumference and opposing the face mass, whereby said lip is adapted to direct fluid to impinge upon one of said entry surfaces.

7. A valve comprising a valve body having a valve chamber and inlet and outlet passages in communication with the valve chamber, a valve member disposed within the valve chamber and movable between open and closed positions relative to the inlet and outlet passages, means for imparting movement to the valve member, seat members formed of elastomer material positioned about the passages, each seat member having a face mass formed with a valve engaging surface sealingly engaging the valve member and at least one entry surface disposed in angular relation with the valve engaging surface, a rear mass, a relatively thin integral web interconnecting the face mass and rear mass at a position adjacent the outer circumference of the face mass, the rear mass being bifurcated and having two diverging pressure actuatable leg portions extending radially beyond the face mass, an annular metal retainer ring surrounding each seat member to afford it circumferential support, a flat restraining washer positioned between the face mass and the valve body, said washer having a lip surrounding its inner circumference and opposing the face mass whereby said lip is adapted to direct fluid to impinge upon one of said entry surfaces.

8. A valve comprising a valve body having a valve chamber and inlet and outlet passages in communication with the valve chamber, a spherical valve member disposed within the valve chamber and rotatable between open and closed positions relative to the inlet and outlet passages, means for imparting rotational movement to the valve member, seat members formed of elastomer material positioned one about each of the passages, each seat member having a face mass formed with a frusto-conical valve engaging surface sealingly engaging the valve member and at least one frusto-conical entry surface disposed in angular relation with the valve engaging surface, a rear mass, a relatively thin integral web interconnecting the face mass and rear mass at a position adjacent the outer circumference of the face mass, the rear mass being bifurcated and having two annular diverging pressure actuatable leg portions in sealing engagement with the valve body one of the leg portions extending radially beyond the face mass, an annular metal retainer ring surrounding each seat member to afford it circumferential support, a flat restraining washer positioned between the face mass and the valve body, said washer having a lip surrounding its inner circumference and opposing the face mass, whereby said lip is adapted to direct fluid to impinge upon said one entry surface.

9. A valve comprising a valve body having a valve chamber and inlet and outlet passages in communication with the valve chamber, a spherical valve member disposed within the valve chamber and rotatable between open and closed positions relative to the inlet and outlet passages, means for imparting rotational movement to the valve member, seat members formed of elastomer material positioned one about each of the passages, each seat member having a face mass formed with a frusto-conical valve engaging surface sealingly engaging the valve member and a pair of entry surfaces disposed one one each side of and in angular relation with the valve engaging surface, a rear mass, a relatively thin integral web interconnecting the face mass and rear mass at a position adjacent the outer circumference of the face mass, the rear mass being bifurcated and having two annular diverging pressure actuatable leg portions in sealing engagement with the valve body one of the leg portions extending radially beyond the face mass, an annular metal retainer ring surrounding each seat member to afford it circumferential support, a flat restraining washer positioned between the face mass and the valve body, said washer having a lip surrounding its inner circumference and opposing the face mass, whereby said lip is adapted to direct flowing fluid to impinge upon one of said entry surfaces.

References Cited by the Examiner
UNITED STATES PATENTS

| | | | |
|---|---|---|---|
| 2,151,442 | 3/39 | Roberts et al. | 251—172 |
| 2,470,925 | 5/49 | Fredrickson | 277—205 X |
| 2,676,041 | 4/54 | Englesson | 277—205 X |
| 2,965,354 | 12/60 | Grove et al. | 251—173 |
| 3,047,300 | 7/62 | Taylor et al. | 277—205 X |
| 3,067,977 | 12/62 | Anderson et al. | 251—172 |
| 3,067,978 | 12/62 | Natho | 251—172 |

FOREIGN PATENTS

| | | |
|---|---|---|
| 1,120,663 | 4/56 | France |
| 810,625 | 3/59 | Great Britain. |

LAVERNE D. GEIGER, *Primary Examiner.*